UNITED STATES PATENT OFFICE.

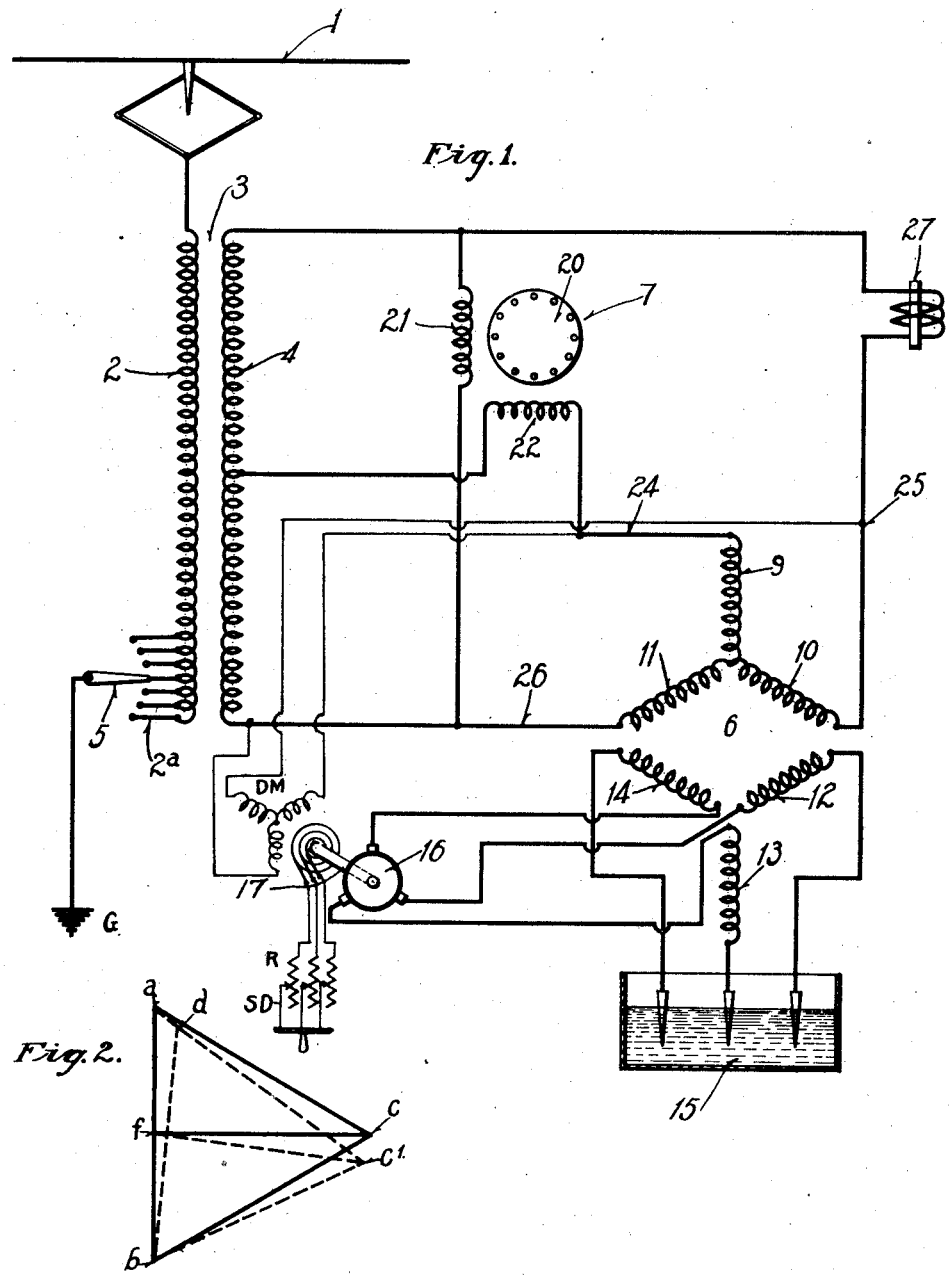

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,258,005.  Specification of Letters Patent.  Patented Mar. 5, 1918.

Application filed February 3, 1915. Serial No. 5,862.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Control Systems, of which the following is a specification.

My invention relates to control systems for alternating-current dynamo-electric machines, and it has special reference to the control and regulation of polyphase railway induction motors that are operated from a single-phase source of energy through the agency of a phase converter.

One of the objects of my invention is to provide a simple system of the above-indicated class which shall be effective and reliable in operation and which shall be particularly adapted to compensate for inherent phase distortions and voltage reductions in the phase converter under load conditions, and, moreover, to maintain balanced phase relations and full voltage as well as good power-factor upon the motor under load conditions.

In a co-pending application, Serial No. 808,714, filed December 26, 1913, by Benjamin G. Lamme and assigned to the Westinghouse Electric & Manufacturing Company, a system of this general type is disclosed in which the converter phase distortions and voltage reductions are compensated for by suitable adjustments of the phase-converter connections with respect to the transformer which serves to supply single-phase energy thereto.

According to my present invention, I propose to insure balanced phase relations and normal magnitude of the voltage supplied to the driving motor by means of an inductive reactance connected in series circuit with one of the motor phase windings for the purpose of correcting for the displacement of phase and also by means of a switching device for varying the taps of the transformer, whereby the voltages may be increased to any desired amount. By reason of the fact that the introduction of the inductive reactance tends to lower the power-factor of the driving motor, it is desirable to employ a phase advancer of any well-known form for maintaining the power-factor at a proper value, under load conditions.

In the accompanying drawing, Figure 1 is a diagrammatic view of a system of control embodying my invention, and Fig. 2 is a vector diagram showing the relationships of certain of the voltages of the system shown in Fig. 1.

Referring to the drawing, a supply conductor 1, which may conveniently constitute a trolley conductor of an electric railway system, delivers single-phase energy to a primary winding 2 of a transformer 3 having a secondary winding 4. The primary winding 2 is provided with a plurality of end taps 2ª which are adapted to be connected to the ground G through a switching device 5, whereby the ratio of transformation between the primary and secondary winding may be varied at will.

Connected to the secondary winding 4 of the transformer 3 is a polyphase induction motor 6 that is adapted to receive energy therefrom through a phase converter 7 that is interposed between the transformer winding 4 and said motor.

The motor 6 is of the three-phase star-connected wound-rotor type, having a plurality of primary windings 9, 10 and 11 and a plurality of secondary windings 12, 13 and 14. The outer terminals of the secondary windings 12, 13 and 14 are connected to an adjustable resistance device, such as a liquid rheostat 15, while the inner terminals thereof are connected together, at the star point, through an armature 16 of an auxiliary phase advancer 17 which performs its usual function of maintaining a good power-factor in accordance with well-known principles.

The phase advancer 17 pertains only indirectly to my present invention and, although I prefer to employ an advancer of the well-known Le Blanc type that is provided with a field-magnet structure without windings, any suitable form of apparatus for accomplishing the desired result may be used.

For driving the phase advancer 17, I have shown an auxiliary motor DM of the three-phase, wound-secondary type, which is driven from the primary circuit of the main motor 6, and is provided with a secondary-circuit variable three-phase resistor R. Appropriate adjustments of the resistor R may be made in any well-known manner, as by a switching device SD, to perform desired phase-regulating functions. It will be understood that any other suitable driving means for, or method of regulation of, the phase-advancer may be employed.

The phase converter 7 may conveniently be of the induction type and comprises a squirrel-cage rotor 20, an exciting winding 21 and a secondary winding 22, said windings being electromagnetically disposed in quadrature relation. The exciting winding 21 is connected across the transformer winding 4 and excited in phase therewith, and the secondary winding 22 has one of its terminals connected substantially to the mid-point of the transformer winding 4 and is designed to deliver a quadrature voltage of substantially 86.6% of that of the transformer winding 4. Moreover, the converter winding 22 is connected in series with the primary winding 9 of the motor 6 through conductor 24, while the motor windings 10 and 11 are connected in multiple with the transformer winding 4 through conductors 25 and 26, respectively.

For the purpose of compensating for the inherent phase distortion of the converter 7 under load conditions and for maintaining balanced phase relations of the voltage supplied to the motor 6, an inductive reactance device 27 is connected in conductor 25 in series circuit with the motor phase winding 10.

With the circuit connections as shown and the motor 6 operating at light or no load, balanced polyphase voltages are supplied thereto, as will be readily understood by those skilled in the art and as clearly indicated in Fig. 2 to which reference may now be made.

In the figure, $a-b$ represents the voltage of the transformer winding 4, while $f-c$ represents that of the converter secondary winding 22 which is of such value and phase position as to combine with the voltage $a-b$ to produce balanced three-phase voltages $a-b$, $b-c$ and $c-a$, which voltages are supplied to the driving motor 6 under the conditions assumed.

If, however, the motor 6 is loaded, there results an inherent displacement of the phase position of the converter voltage which causes the point $c$ to occupy a position $c'$. Were it not for the inductive reactance device 27, therefore, the voltages supplied to the motor 6 would be unbalanced and represented by the triangle $abc'$. However, by employing the inductive reactance 27 and properly choosing its value with respect to the normal load conditions, a voltage drop is produced therein represented by the line $a-d$ which serves to maintain balanced phase relations and voltages upon the motor 6, as represented by the triangle $dbc'$. This condition of balanced voltages depends, of course, upon the proper choice of inductance to meet the normal service conditions, and it will be noted that, while the voltages are balanced with respect to phase positions, the magnitudes thereof are somewhat reduced from that initially supplied to the motor.

Full voltages, however, may be obtained readily by shifting the switching device 5 to the proper inner tap $2^a$, whereby an increased voltage is delivered to the transformer secondary winding 4 and, consequently, to the converter winding 22. Therefore, the resultant polyphase voltages are also correspondingly increased, and, balanced voltages of full normal value are thus supplied to the driving motor 6.

The effect of the inductive reactance 27 is to lower the power-factor of the driving motor, which, however, may be improved or, in fact, maintained at any desired value by suitable adjustments of the phase advancer 17, as will be understood.

Obviously, the advantages and benefits of my invention may be obtained by means of apparatus and circuit connections which differ materially from those herein set forth but which embody the basic principles of my invention. I, therefore, desire that only such limitations shall be imposed as are indicated in the appended claims.

I claim as my invention:

1. In a converting system, the combination with a source of single-phase alternating current, of a polyphase load circuit, connections for transferring energy directly from said source to one phase of said load circuit, a phase-converter, connections for combining the tertiary electromotive force of said phase-converter with the electromotive force of said source for energizing the remaining phases of said load circuit, and means for producing a reactive drop in said first named connections proportional to the reactive drop produced by said phase-converter in said last-named connections, whereby the electromotive forces supplied to said load circuit may be maintained in substantial balance throughout wide load changes.

2. In a converting system, the combination with a source of single-phase alternating current, of a polyphase load circuit, connections for transferring energy directly from said source to one phase of said load circuit, a phase-converter, connections for combining the tertiary electromotive force of said phase-converter with the electromotive force of said source for energizing the remaining phases of said load circuit, and a reactive element in said first-named connections designed to produce a reactive drop therein proportional to the reactive drop produced by said phase-converter in said last-named connections, whereby the electromotive forces supplied to said load circuit may be maintained in substantial balance throughout wide load changes.

3. In a converting system, the combination with a source of single-phase alternating current, of a polyphase load circuit, connections for transferring energy directly from said source to one phase of said load circuit, a phase-converter, connections for combining the tertiary electromotive force of said phase-converter with the electromotive force of said source for energizing the remaining phases of said load circuit, means for producing a reactive drop in said first-named connections proportional to the reactive drop produced by said phase-converter in said last-named connections, whereby the electromotive forces supplied to said load circuit may be maintained in substantial balance throughout wide load changes, and means for compensating for the power-factor-diminishing effect of said reactive-drop-producing devices.

4. In a converting system, the combination with a source of single-phase alternating current, of a polyphase load circuit, connections for transferring energy directly from said source to one phase of said load circuit, a phase-converter, connections for combining the tertiary electromotive force of said phase-converter with the electromotive force of said source for energizing the remaining phases of said load circuit, a reactive element in said first-named connections designed to produce a reactive drop therein proportional to the reactive drop produced by said phase-converter in said last-named connections, whereby the electromotive forces supplied to said load circuit may be maintained in substantial balance throughout wide load changes, and a phase-advancing dynamo-electric machine electrically associated with said load circuit and adapted to compensate for the power-factor-reducing effects of said reactive elements.

5. The combination with a source of single-phase energy, a transformer connected thereto, a three-phase induction motor, and a phase converter interposed between said motor and said transformer and having an exciting winding connected across said transformer and a secondary winding connected to the midpoint of said transformer, of an inductive device in series circuit with one phase of said motor for compensating for phase distortions in said converter under load conditions, and means associated with said transformer for varying the polyphase voltages supplied to said motor.

6. The combination with a source of single-phase energy, a transformer connected thereto, a three-phase induction motor having a star-connected secondary winding and a phase converter interposed between said transformer and said three-phase motor for supplying three-phase energy to said motor, of an inductance connected in series with one of the phases of said motor for maintaining balanced phase relations under load conditions, means associated with said transformer for increasing the magnitude of the polyphase voltages supplied to said motor under load conditions, and a phase advancer connected in the star-point of the motor secondary windings for regulating the power-factor of the motor under load conditions.

In testimony whereof, I have hereunto subscribed my name this 30th day of Jan. 1915.

RUDOLF E. HELLMUND.

Witnesses:
F. W. McCloskey,
B. B. Hines.